UNITED STATES PATENT OFFICE.

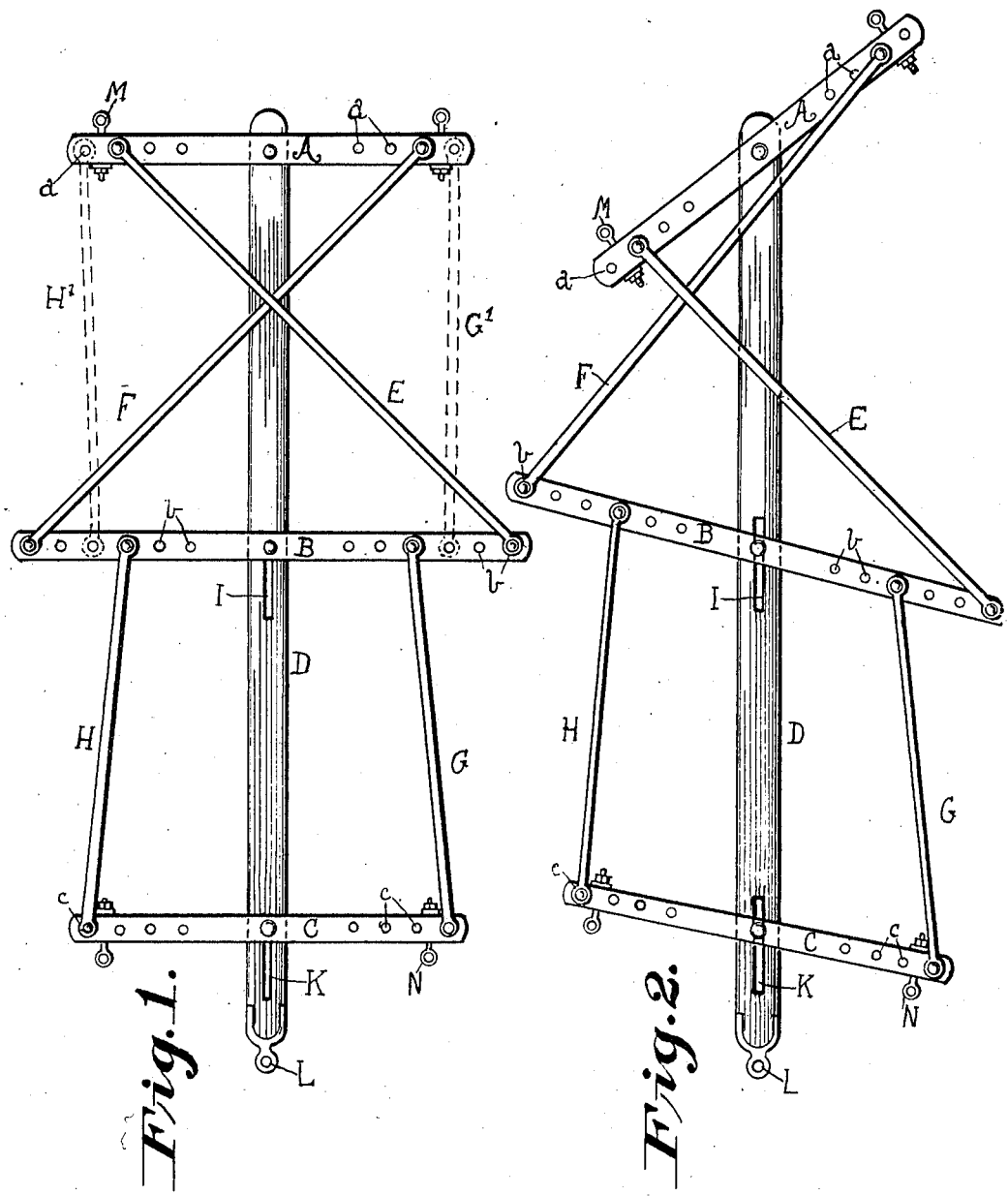

FRANK X. LAUTERBUR, OF SIDNEY, OHIO.

AUTOMATIC TONGUE.

970,244.  Specification of Letters Patent.  Patented Sept. 13, 1910.

Application filed July 13, 1909.  Serial No. 507,344.

*To all whom it may concern:*

Be it known that I, FRANK X. LAUTERBUR, a citizen of the United States of America, and resident of Sidney, in the county of Shelby and State of Ohio, have invented certain new and useful Improvements in Automatic Tongues, of which the following is a specification.

My invention relates to wagon tongues and more especially to that class of wagon tongues which are used in drawing a chain or train of wagons or other vehicles.

The object of my invention is to produce an adjustable wagon tongue adapted to be connected to the forward truck of a suitable vehicle and to be connected to another vehicle in the same train or to a traction engine or other motive power adapted to hauling purposes.
Another object of my invention is the production of a wagon tongue for the purpose above described, which will cause the wagon attached thereto, to follow in the tracks of the next preceding wagon.
Another object of my invention is to provide a wagon tongue as above, which may be rendered adjustable for vehicles having wheel-bases of different lengths.

Still another object of my invention is the provision of a wagon tongue which may be used for the purposes above described and which may be transformed into the type of tongue ordinarily used upon wagons and similar vehicles.
With the above and other objects in view, my invention consists of such details of construction and combinations of parts, which will be hereinafter more fully described and specifically pointed out in the claims.
In describing my invention in detail, reference will be had to the accompanying drawings, in which like reference characters indicate the same or similar parts throughout the several views and in which, Figure 1, is a plan view of my improved wagon tongue as it appears when the draft is along a straight road, Fig. 2 is a plan view of said tongue as it appears when the forward wagon or other hauling apparatus is turning a corner.

D is a wagon tongue of the usual construction having a number of longitudinal slots I, K therein. A number of bars are suitably pivoted to the tongue D. I preferably construct my device with three of these bars, A, B, and C, but it will be understood that I may employ more if circumstances warrant a different construction. The two foremost bars, B and C, are so mounted upon the tongue D as to have a longitudinal movement in the slots I, K. A plurality of holes, $a$, $b$ and $c$ are formed in the three bars, between the pivoted connection and the outer ends of said bars.

The diametrically opposite ends of the rearmost and middle bars are connected by suitable rods E, F, which may be adjusted in any of the holes $a$, $b$. The foremost and middle bars have rods H and G connecting the corresponding ends thereof, said rods being adapted for insertion into any of the holes $b$, $c$ in these bars. Suitable means are provided upon the bar A, whereby the tongue may be connected to the truck or running gear of a wagon and like means may be placed upon the bar C whereby the latter may be connected to the preceding wagon or to a traction engine or the like.

From the foregoing, it will be seen, that when the bar C moves upon its pivoted connection, the bar B rotates sufficiently to remain approximately parallel with the first named bar. Because of the cross rods E, F, the bar A is caused to swing in the opposite direction, as fully disclosed in Fig. 2. It will be evident, therefore, that if the bar C is attached to one of the train of wagons, the following wagon will be caused to turn in the tracks of the preceding wagon, and it will not be permitted to cut any distance whatever off of the turn. In other words, each wagon of the train will turn upon the same ground as the preceding wagon. The degree or amount of swing or throw of the bar A, in relation to the swing of the bar C, may be regulated by adjusting the rods E and F in the holes $a$ and $b$, moving them either inwardly toward the pivot or outwardly toward the ends of the bars, as the case may require. Like manipulation of the rods G and H in the holes b and c, will produce similar results. When the traction engine or other hauling apparatus has the same length wheel base as the following wagons, my device will be adjusted as shown in Fig. 1. When, however, the wheel bases of the various vehicles differ in length then other adjustment will become necessary. For instance, suppose the leading wagon has a wheel base of 10 ft., while the following one has a wheel base of 12 feet. If it is desired that the back wheels of the second wagon should follow in the tracks of those of the former, it would be necessary to make the front wheels of the second wagon over-track those of the leading wagon. This can be accomplished by placing the ends of the rods E and F in the holes nearer the pivotal connection of the bar A or a like result could be accomplished by placing the ends of the rods G and H in the holes b, near the center of the bar B. Either of these adjustments would cause the throw of the bar A to become greater.

It is evident that I can have as many adjustments as there are holes in the three bars and the range of operation of my device is limited only by the number of these holes and the length of the bars. Preferably, I construct the bar B somewhat longer than the other two.

One great advantage of my improved tongue is, that it may be transformed into the ordinary type when it is desired to detach a wagon from the train. This saves the necessity of entirely removing the tongue and attaching another one. I obtain this result by adapting the rods G and H, so that they may be swung around upon the bar B and be connected to the bar A as shown in dotted lines at G' and H'. In this way the bars A and B become rigid upon the tongue member D. Double trees may then be attached by any suitable means, to the bar B and horses or other draft animals hitched to the tongue in the usual manner. To facilitate this operation, I provide the member L of usual construction upon the end of the tongue.

The bars B and C are capable of a longitudinal yielding motion in the slots I and K, which are essential in allowing free play of the members B and C when turning a curve of the road. The slots I, and K constitute guide ways for the longitudinal movement of the bars B and C. All of the strain therefore, is transmitted to the four rods, which have a slight yielding motion, incidentally equalizing the draft, as will be readily understood by reference to the drawing.

From the foregoing, it will be seen that I provide a tongue which is cheaply constructed and may be easily applied to any suitable vehicle, and which will be effective when applied to each one of a train of wagons.

It will enable one or more wagons, drawn by motive power of any kind, to turn around corners or in a complete circle, as the case may be, without each succeeding wagon starting to make the turn before reaching the point at which the preceding wagons turned. The tongue, as shown, is positively automatic in action, after once adjusted to suit the wheel bases of the preceding vehicles, and no attention is necessary, so that the driver of the traction engine need pay no attention whatever to the number of wagons behind the draft apparatus.

It will be understood that the foregoing is my preferred form of invention and that I am not limited thereto, for slight changes of construction may be resorted to without deviating from the spirit and scope of my said invention.

I claim:

1. A wagon tongue comprising a tongue member proper having a plurality of longitudinal slots, a plurality of bars pivotally mounted upon said tongue member, the foremost of said bars capable of a longitudinal movement in said slots, and means connecting the bars whereby they are caused to pivotally co-act.

2. A wagon tongue comprising a tongue member, a plurality of bars pivotally mounted upon the tongue member, said tongue being provided with guide ways longitudinally of the tongue member and in fixed relation thereto, said guide ways engaging the pivotal connections of said bars, and means connecting the bars.

3. A wagon tongue comprising a tongue member, a plurality of bars pivotally mounted upon the tongue member, said tongue being provided with guide ways longitudinally of the tongue member and in fixed relation thereto, said guide ways engaging the pivotal connections of said bars, means connecting the said bars, said means having alternately interchangeable connections with the front and rear bars.

4. A wagon tongue comprising a tongue member, a plurality of bars pivotally mounted upon the tongue member, said tongue being provided with guide ways longitudinally of the tongue member and in fixed relation thereto, said guide ways engaging the pivoted connections of said bars, rods connecting the ends of said bars, a pair of said rods crossing said tongue member diagonally, a pair of said rods being approximately parallel with said tongue member and having interchangeable connections with the front and rear bars.

5. A wagon tongue comprising a tongue member proper having a plurality of longitudinal slots, a plurality of bars pivotally mounted upon said tongue member, one of said bars fixed, the other slidable in said slots, and means connecting the bars whereby they are caused to pivotally coact, said fixed bar adapted to be connected to the front of a vehicle and one of said slidable bars adapted to be connected to suitable hauling means.

In testimony whereof, I hereunto affix my signature in the presence of two witnesses.

FRANK X. LAUTERBUR.

Witnesses:
  HUGH DOORLEY,
  PAUL LAUTERBUR.